United States Patent [19]

Shimizu

[11] Patent Number: 5,099,377

[45] Date of Patent: Mar. 24, 1992

[54] PAD SUPPORT DEVICE INCORPORATING LEAF SPRING

[75] Inventor: Hitoshi Shimizu, Omiya, Japan

[73] Assignee: Asahi Kogaku Kogyo Kabushiki Kaisha, Tokyo, Japan

[21] Appl. No.: 549,097

[22] Filed: Jul. 6, 1990

[30] Foreign Application Priority Data

Jul. 7, 1989 [JP] Japan ................... 1-176772

[51] Int. Cl.⁵ ............................................. G11B 5/82
[52] U.S. Cl. ........................... 360/130.34; 360/130.3; 360/103; 360/104
[58] Field of Search ................... 360/103–106, 360/128, 130.3–130.34

[56] References Cited

U.S. PATENT DOCUMENTS

| | | | |
|---|---|---|---|
| 3,071,773 | 1/1963 | Haughton et al. | 360/103 |
| 3,151,319 | 9/1964 | Marrs | 360/103 |
| 3,489,381 | 1/1970 | Jones et al. | 360/103 |
| 4,058,843 | 11/1977 | Gyi | 360/103 |
| 4,466,032 | 8/1984 | Saito | 360/130.34 |
| 4,630,158 | 12/1986 | Spash | 360/103 |
| 4,740,854 | 4/1988 | Shibuya et al. | 360/104 |
| 4,835,646 | 5/1989 | Kurosawa et al. | 360/109 X |

FOREIGN PATENT DOCUMENTS

| | | | |
|---|---|---|---|
| 60-101760 | 6/1985 | Japan | 360/130.34 |
| 60-164958 | 8/1985 | Japan | 360/130.34 |
| 62-16270 | 1/1987 | Japan | 360/130.34 |
| 63-117362 | 5/1988 | Japan | 360/130.34 |
| 1390794 | 4/1975 | United Kingdom . | |
| 2189928 | 11/1987 | United Kingdom . | |
| 8101071 | 4/1981 | World Int. Prop. O. . | |

Primary Examiner—A. J. Heinz
Assistant Examiner—Alfonso Garcia
Attorney, Agent, or Firm—Sandler, Greenblum, & Bernstein

[57] ABSTRACT

A pad support device for supporting a pad member which is to be pressed against a disk member accomodated in a jacket. A movable member is moved toward and away from the disk member. A plate member carries the pad member, and a leaf spring is formed such that the leaf spring has at least two openings. A first portion of the leaf spring between the at-least-two openings is bent in one direction out of the plane of the surface thereof to be substantially arch-shaped while at-least-two second portions of the leaf spring are bent in a direction in which the first portion is bent to also be substantially arch-shaped. The first portion is secured to one of the movable member and the plate member, while the second portions are secured to the other of the movable member and the plate member, whereby the plate member is resiliently suspended from the movable member.

8 Claims, 6 Drawing Sheets

PAD SUPPORT DEVICE INCORPORATING LEAF SPRING

BACKGROUND OF THE INVENTION

1. Field of the Invention

The present invention relates to a pad support device for supporting a pad which is to be pressed against an object.

2. Description of Background and Relevant Materials

Figure 1:
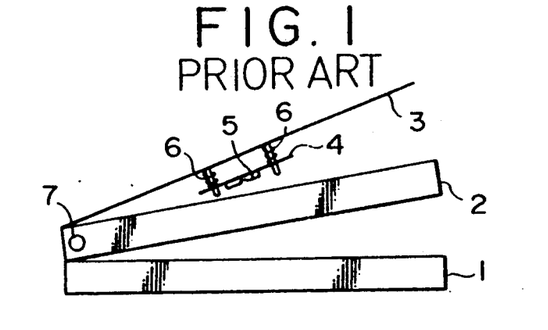
FIG. 1 is a side view of a conventional pad support device.
Figure 2:
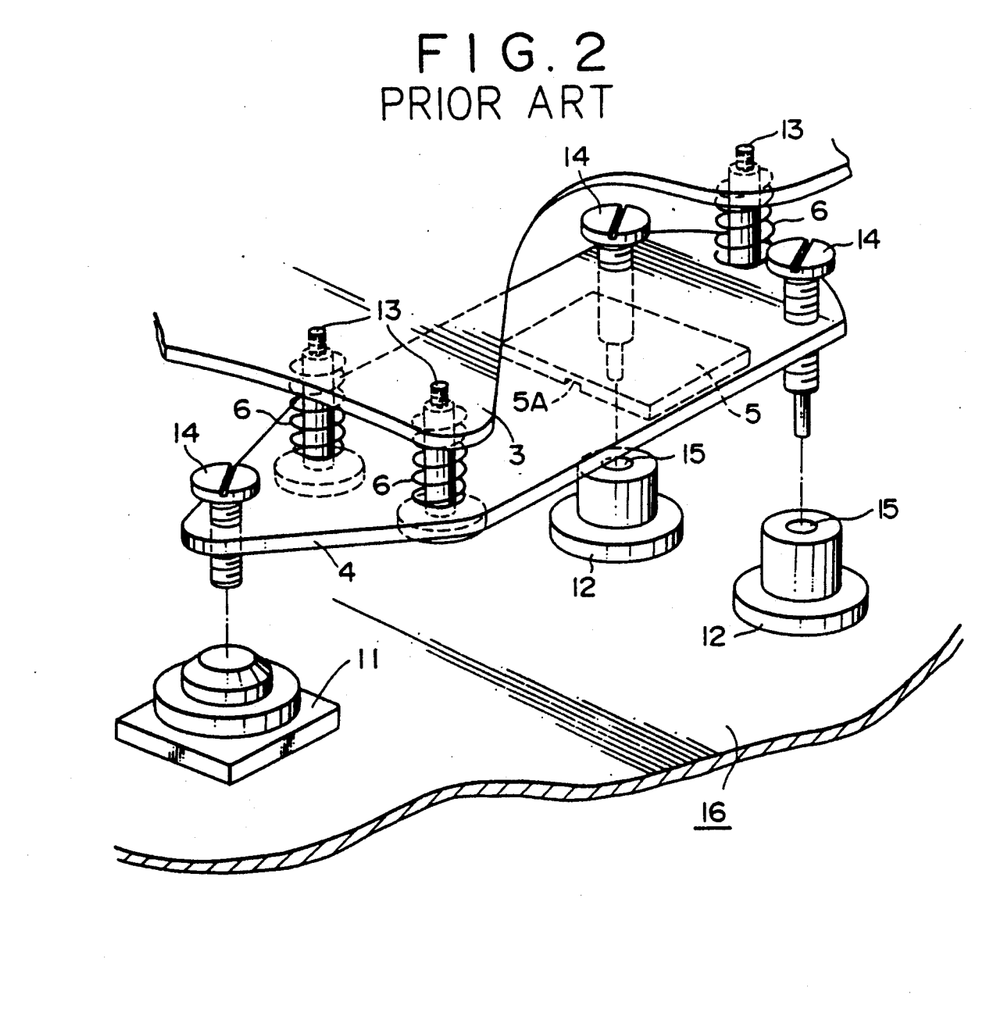
FIG. 2 is a cut away perspective view of the conventional pad support device of FIG. 1.

FIGS. 1 and 2 depict examples of pad supports known in the art.

FIG. 1 is a side view illustrating an arrangement of an example of a pad support device of a conventional electronic still camera, in which a jacket accommodating a magnetic disk is pressed by a pad.

In FIG. 1, a spindle motor (not shown) or the like is mounted on a main body 1, and a holder 2 and a cover member 3 are rotatable about the shaft 7 of the main body 1.

A support plate 4 is movably mounted on the cover member 3, and a pad 5 is attached to a lower surface of the support plate 4.

Springs 6 are urged in a direction for separating the support plate 4 from the cover member 3.

FIG. 2 is an enlarged perspective view of a pad support device in FIG. 1.

In FIG. 2, a spindle motor 11 is mounted on a base 16 of the main body 1, bosses 12 are fixed to the base 16, each boss has a hole 15. Each of the mounting screws 13 passes through the center of respective spring 6 and engages the support plate 4, the support plate 4 being movably attached to the cover member 3 by the mounting screws 13, between the support plate 4 and the heads of the mounting screws 13. Adjustment screws 14 are threaded into the support plate 4.

The springs 6 are disposed at three locations about the pad 5 to enable the support plate 4 to be pressed against the main body 1 substantially in parallel with the main body 1.

Figure 8:
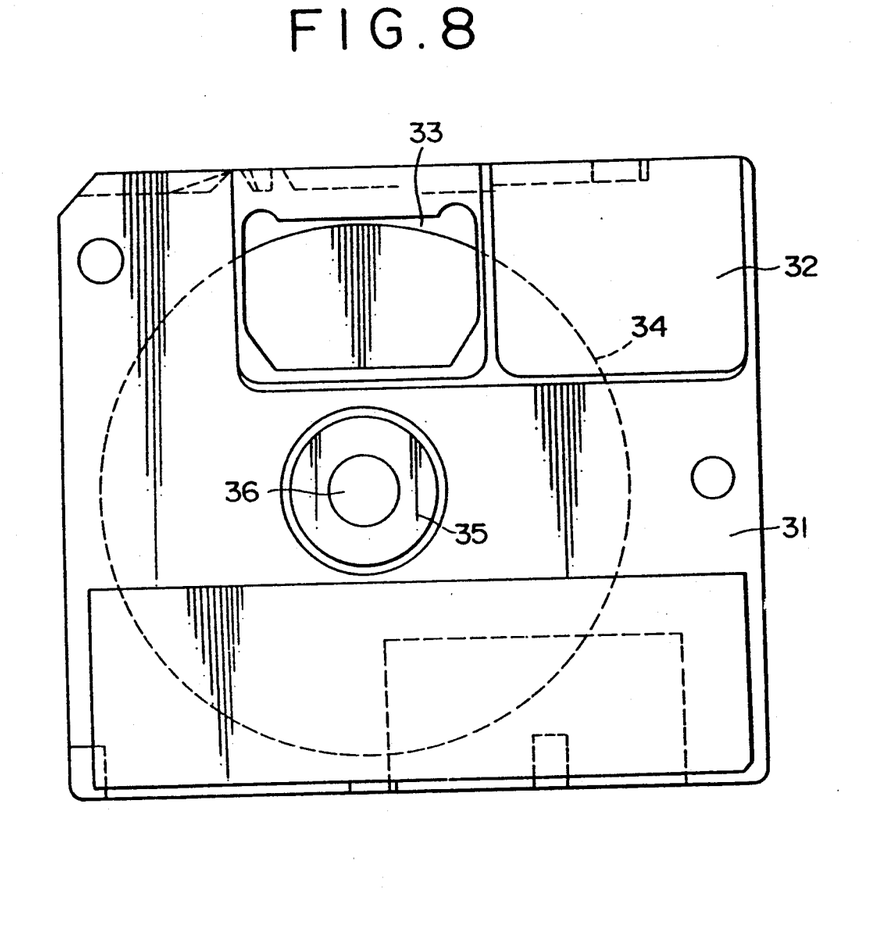
FIG. 8 is a plan view illustrating a jacket according to the present invention.

FIG. 8 shows an example of a jacket used in the electric still camera. When the cover member 3 and the holder 2 are released from the main body 1 and a jacket 31 accommodating a magnetic disk 34 is inserted into the holder 2, the shutter 32 of the jacket 31 is released and a magnetic disk 34 is exposed. When the cover member 3 is depressed downwardly in FIG. 1, the cover member 3 and the holder 2 are rotated clockwise about the shaft 7.

When the holder 2 is rotated to a predetermined position, it is held in abutment against the base 16 and stopped.

Figure 3:
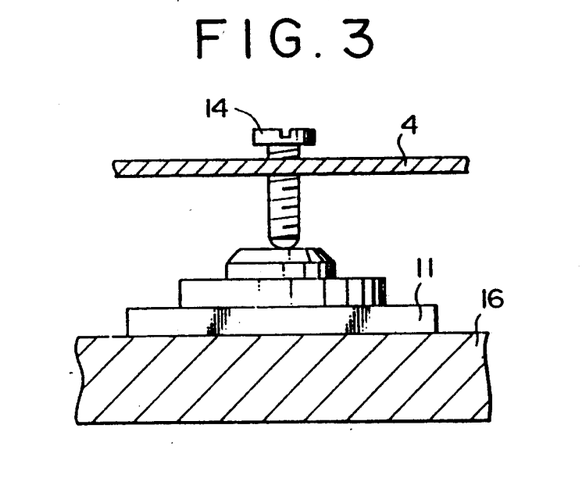
FIGS. 3 and 4 are side views illustrating adjustment screws according to the present invention.
Figure 4:
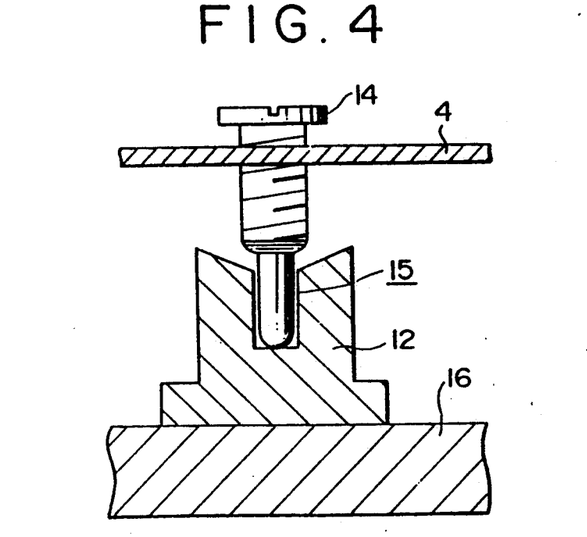

When the cover member 3 is rotated to the predetermined position, the pad 5 is held in abutment against the magnetic disk 34 which is exposed from the jacket 31. As shown in FIGS. 3 and 4, when the cover member 3 is further rotated by a slight amount, one of the adjustment screws 14 is held in abutment against the spindle motor 11 and the other two screws pass through the holes 15 of the bosses 12 and the extreme end of each screw is held in abutment against the bottom of the hole 15.

The cover member 3 is stopped in this state and locked to the main body 1. The height of the pad 5 in this case can be adjusted in such a manner that the adjustment screws 14 are rotated to advance the pad 5 or to retract the pad from the support plate 4.

At this time, the magnetic disk 34 in the jacket 31 is placed on the spindle motor 11 and rotated in the jacket 31.

Figure 11:
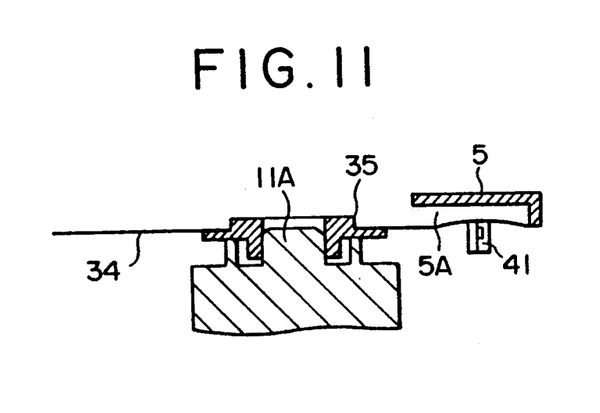
FIG. 11 is a cross-sectional view taken along the line XI—XI of FIG. 10.

When a magnetic head (not shown) is held in abutment against the magnetic disk 34 from the opposite side of the pad 5, the magnetic disk 34 is slightly elastically deformed to project into the interior of a groove 5A of the pad 5 and brought into close contact with a magnetic head 41 (FIG. 11). The magnetic head is moved in the radial direction of the magnetic disk 34 along the groove 5A of the pad 5 in this state, so that data is recorded and reproduced.

The vertical vibrations of the magnetic disk are absorbed by the elasticity of the magnetic disk itself, the pad 5 and the springs 6.

When the cover member 3 is unlocked from the main body 1 and rotated counterclockwise about the shaft 7 to a predetermined position in FIG. 1, the locking portion (not shown) connected to the cover member 3 is held in abutment against the holder 2, and thereafter the holder 2 is rotated together with the cover member 3. The pad 5 is set to be located above the holder 2, when the locking portion is held in abutment. Therefore, when the cover member is rotated to the predetermined position, the jacket can be taken out of the holder 2.

As described above, the conventional pad support device is arranged such that the three springs 6 are disposed around the pad 5 to thereby press the support plate 4 (pad 5) against the magnetic disk. This conventional arrangement has several drawbacks in that the number of parts is increased and many assembly processes are necessary. Furthermore, the urging force tends to be unbalanced by the variation, deterioration with age and the like of the respective springs 8, whereby the pad is unstably held.

SUMMARY OF THE INVENTION

Taking the above into consideration, it is, therefore, an object of the invention to decrease the number of parts and realize a device capable of a stable holding operation.

To achieve the above objects, according to the present invention, there is provided a pad support device for supporting a pad member which is to be pressed against a disk member accommodated in a jacket, which includes:

a movable member which is moved toward and away from the disk member;

a plate member carrying the pad member; and a leaf spring which is formed such that the leaf spring has at least two openings. A first portion of the leaf spring between the openings is bent in one direction substantially orthogonal to the spring's surface, to be substantially arch-shaped, while second portions of the leaf spring are bent in a direction opposite to the one direction to also be substantially arch-shaped. The apex of the first portion is secured to one of the movable members or the plate member, while the apexes of the second portions are secured to the other of the movable member or the plate member, whereby the plate member is resiliently suspended from the movable member.

DETAILED DESCRIPTION OF THE EMBODIMENTS

Figure 5:
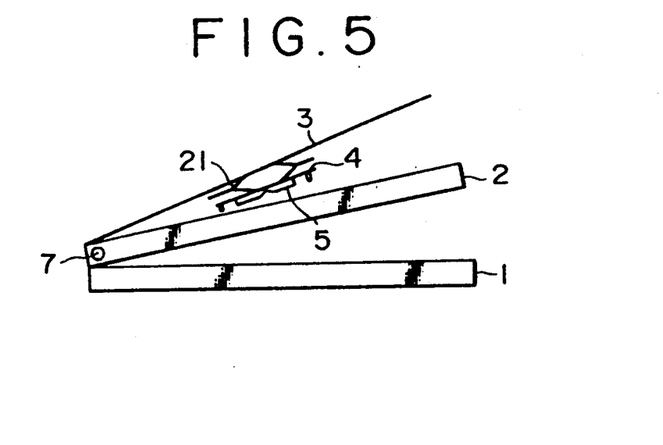
FIG. 5 is a side view illustrating an embodiment of a pad support device according to the present invention.
Figure 6:
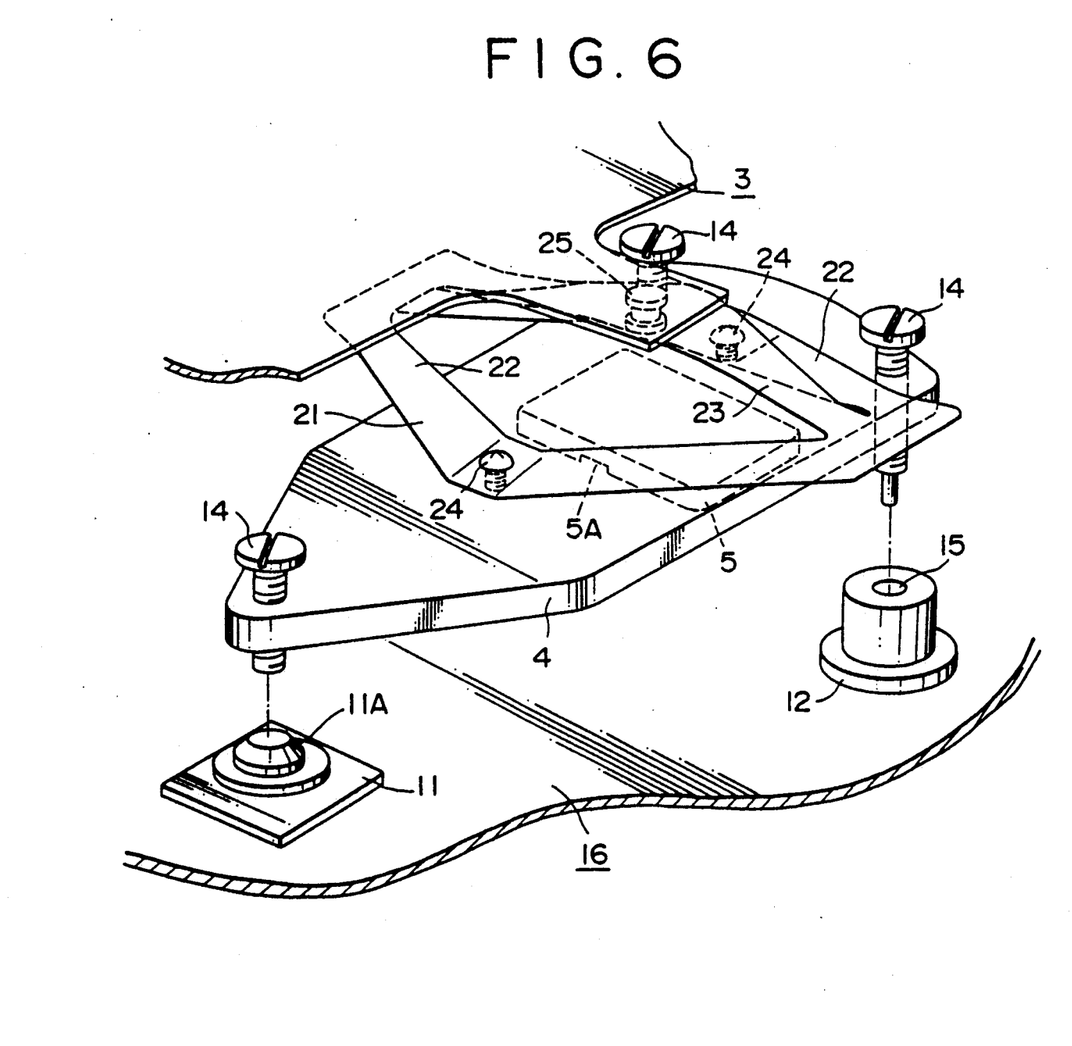
FIG. 6 is a perspective view illustrating an embodiment of a pad support device according to the present invention.

FIGS. 5 and 6 are a side view and a perspective view, respectively, illustrating the arrangement of an embodiment of a pad support device according to the present invention.

Figure 7A:
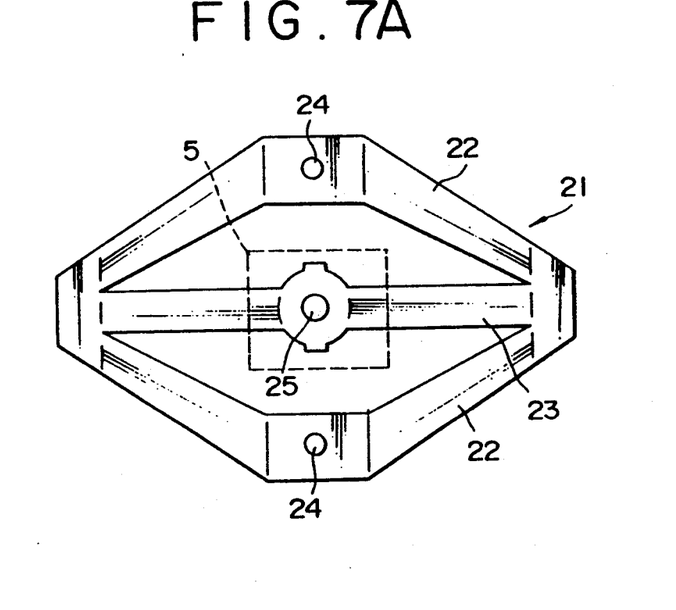
FIG. 7A is a plan view of a leaf spring according to the present invention, as shown in FIGS. 5 and 6.
Figure 7B:
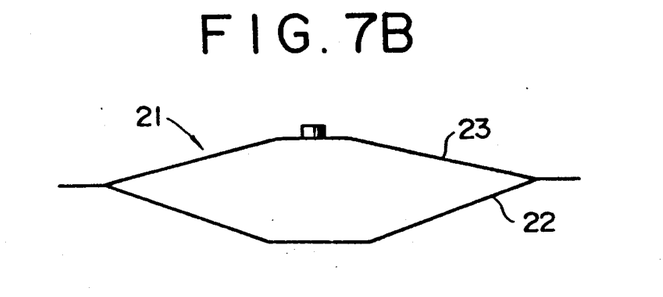
FIG. 7B is a side view of a leaf spring according to the present invention, as shown in FIGS. 5 and 6.

In FIGS. 5 and 6, there is provided a leaf spring 21 which is formed such that the leaf spring 21 has a first arm 23 which is bent in one direction substantially orthogonal to the surface thereof so as to be substantially arch-shaped, while two arms 22, 22 are bent in a direction opposite to the direction in which the first arm 23 is bent, to be also substantially arch-shaped as shown in FIGS. 7A and 7B.

The apexes of the substantially arch-shaped arms 22, 22 are attached to the support plate 4, while the apex of the substantially arch-shaped arm 23 is attached to the cover member 3, whereby the support plate 4 is resiliently suspended from the cover member 3.

Figure 9:
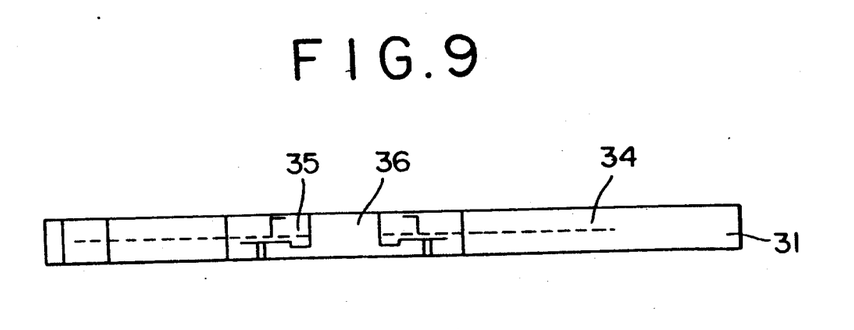
FIG. 9 is a side view illustrating the jacket according to the present invention.

FIGS. 8 and 9 are a plan view and a side view, respectively, illustrating the arrangement of an example of a jacket to be accommodated in a holder 8.

As shown in FIGS. 8 and 9, the jacket 31 has a shutter 32 to be opened and closed from an opening 33. A part of a magnetic disk 34 is exposed by the opening 33 when the shutter 32 is released; a hub 35 is disposed at the center of the magnetic disk 34 and a hole 36 is defined at the center of the hub 35. The other arrangement thereof is the same as that of the conventional pad support device.

As shown in FIG. 5, when the jacket 31 is inserted into the opened holder 2, the projection (not shown) of the holder 2 is held in abutment against the jacket 31 to open the shutter 32. When the cover member 3 is closed to a predetermined position, a pad 5 disposed at the position corresponding to the opening 33 is held in abutment against the magnetic disk 34 exposed by the opening 33. When the cover member 3 is further closed, the arms 22 and 23 are elastically deformed in the direction at which they approach each other. As shown in FIGS. 3 and 4, with this arrangement, when the cover member 3 is closed to the position where the adjustment screws 14 are held in abutment against a spindle motor 11 and the holes 15 of bosses 12 and locked to a main body 1, the leaf spring 21 presses the magnetic disk 34 by the elastic force thereof through the pad 5.

As shown in FIG. 7A, the leaf spring 21 is attached to the support plate 4 in such a manner that the pad 5 is located substantially at the center of the arm 23. More specifically, the pad 5 is located substantially at the midpoint of the two screws 24; the screw 25 is located just above the pad 5. With this arrangement, the pressing force applied by the leaf spring 21 is balanced and the pad 5 is pressed while it is held substantially in parallel with the magnetic disk 34. The result is that the holding operation thereof is stabilized.

Figure 10:
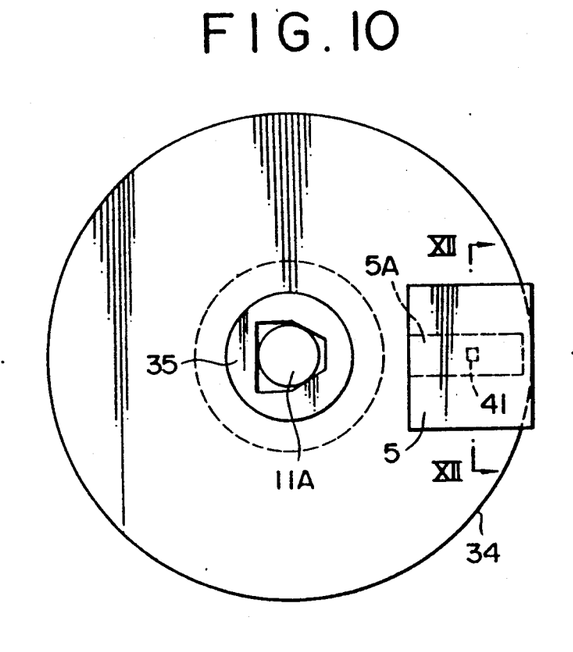
FIG. 10 is a plan view showing the relationship between a magnetic disk and a pad in abutment according to the present invention.
Figure 12:
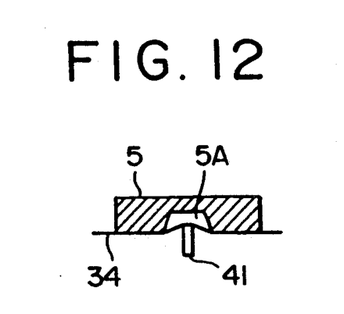
FIG. 12 is a cross-sectional view taken along the line XII—XII of FIG. 10.

FIGS. 10 through 12 show the position in which the magnetic disk 34 is held in abutment against the pad 5.

As shown in FIGS. 10 through 12, the rotating shaft 11A of the spindle motor 11 is caused to pass through the center hole of the hub 35 to rotate the magnetic disk 34. A magnetic head 41 is pressed against the magnetic disk 34 from the opposite side of the pad 5. With this arrangement, a portion of the magnetic disk 34 is inserted into a groove 5A and the other portion thereof is pressed against the pad 5. As a result, the magnetic head 41 is sufficiently pressed against the magnetic disk 34 and thus data can be correctly recorded and reproduced.

Since the magnetic head 41 is moved in the radial direction on the magnetic disk 34 along the groove 5A, desired tracks ranging from the inner circumference to the outer circumference of the magnetic disk 34 can be accessed.

When the cover member 3 is released from the main body 1, the leaf spring 21 supports the support plate 4 such that the leaf spring's elastic deformation is almost removed. As shown in FIG. 5, when the locking portion of the cover member 3 locks the holder 2, the pad 5 is located above the holder 2. Therefore, in this position, the jacket 31 can be taken out of the holder 2.

The height of the pad 5 can be adjusted by rotating the adjustment screws 14 to be advanced or to be retracted with respect to the support plate 4 as described previously.

Note that this invention is applicable to pad support devices in addition to electronic still cameras.

As described above, according to the pad support device of the present invention, since the support plate to which the pad is attached is supported by the cover member through the single leaf spring, not only the number of parts and assembly processes is reduced, but the pad can be stably pressed against a member to be pressed such as a magnetic disk and the like.

What is claimed is:

1. A pad support device for supporting a pad member which is to be pressed against an information disk storage member accommodated in a jacket, comprising:

a movable member which is moved toward and away from said disk member;

a plate member carrying said pad member; and a leaf spring having at least two ends, said ends having flat surfaces which lie in and define a plane, said leaf spring further having at least two openings, a first portion of said leaf spring between said at least two openings being bent in one direction out of said plane to form a substantial arch-shape, and at least two second portions of said leaf spring being bent in a direction out of said plane opposite to said one direction to form respective substantial arch-shapes, wherein each said substantial arch shape comprises an apex portion and said leaf spring is positioned between and connected to said movable member and said plate member via said apexes.

2. The pad support device according to claim 1, wherein said at least two second portions comprises two arms, wherein said first portion comprises another arm arranged between said two arms, each said arm having a substantial midpoint, said another arm being bent towards said one direction at said substantial midpoint thereof, said two arms being bent in a direction opposite to that of said another arm at said substantial respective midpoints.

3. The pad support device according to claim 2, wherein said plate member has an upper surface and a lower surface, said plate member being connected to said leaf spring on said upper surface, said pad member being connected to said lower surface, below said apex of said another arm.

4. The pad support device according to claim 3, wherein said pad member includes a groove extending in a radial direction of said disk member at the portion where said pad member is adapted to press said disk member.

5. The pad support device according to claim 2, which further comprises adjusting means for adjusting the position of said pad member in the direction where said pad member is adapted to press said disc member.

6. The pad support device according to claim 5, which further comprises a base plate, wherein said adjusting means comprises a plurality of protruding members on said plate member which protrude toward said base plate, the amount of protrusion of said respective protruding members being changeable, whereby the clearance between said base plate and said pad member is adjustable.

7. The pad support device according to claim 8, wherein a plurality of holes are formed on said plate member, wherein said protruding members comprise respective screw members adapted to engage with respective holes formed on said plate member.

8. The pad support device according to claim 7, which further comprises a plurality of bosses on said base plate each adapted to receive a respective one of said screw members, an extreme end of each screw member adapted to be held in abutment against a respective one of said bosses.

* * * * *

UNITED STATES PATENT AND TRADEMARK OFFICE
CERTIFICATE OF CORRECTION

PATENT NO. : 5,099,377
DATED : March 24, 1992
INVENTOR(S) : Hitoshi SHIMIZU

It is certified that error appears in the above-indentified patent and that said Letters Patent is hereby corrected as shown below:

At column 6, line 13 (claim 7, line 1), change "claim 8" to ---claim 6---.

Signed and Sealed this

Twenty-ninth Day of March, 1994

*Attest:*

BRUCE LEHMAN

*Attesting Officer*   Commissioner of Patents and Trademarks